(No Model.)
R. AITKEN.
BAND CUTTER AND FEEDER FOR THRASHING MACHINES.
No. 322,886. Patented July 28, 1885.
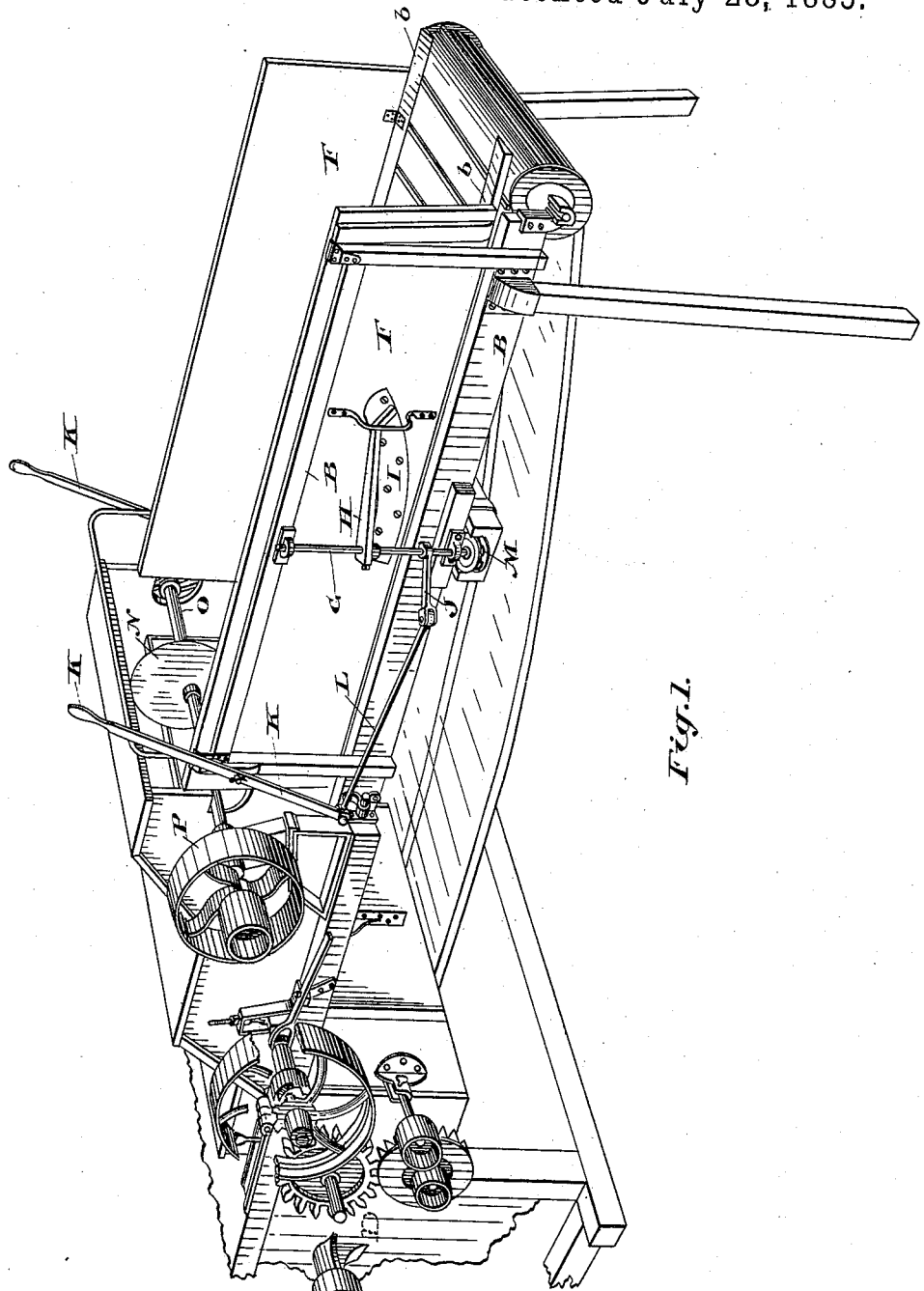

(No Model.) 2 Sheets—Sheet 2.
R. AITKEN.
BAND CUTTER AND FEEDER FOR THRASHING MACHINES.
No. 322,886. Patented July 28, 1885.
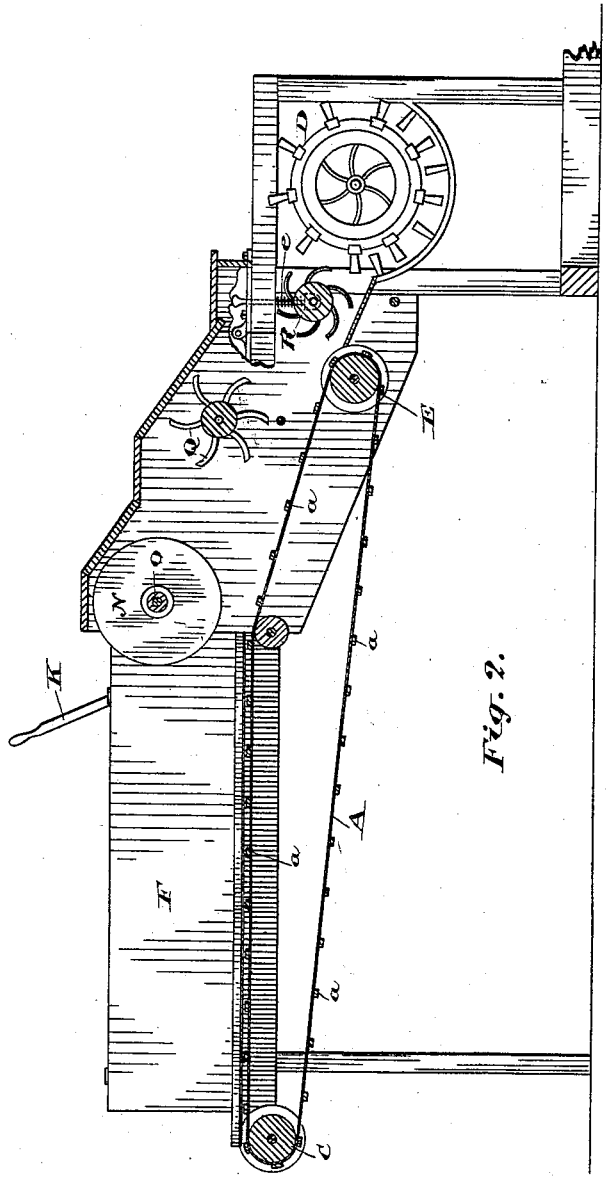
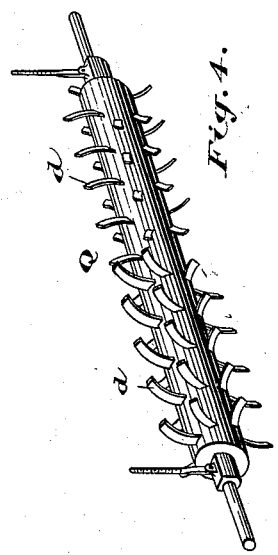
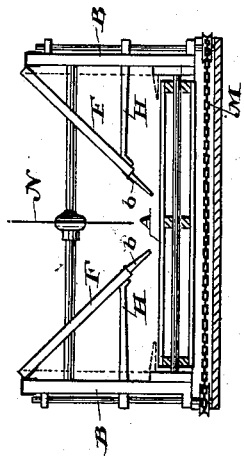
Witnesses.
J. B. Featherstonhaugh
J. M. Jackson
Inventor.
Robert Aitken
by Donald C. Ridout & Co
Attys

United States Patent Office.

ROBERT AITKEN, OF BRAMPTON, ONTARIO, CANADA.

BAND-CUTTER AND FEEDER FOR THRASHING-MACHINES.

SPECIFICATION forming part of Letters Patent No. 322,886, dated July 28, 1885.

Application filed April 15, 1885. (No model.)

*To all whom it may concern:*

Be it known that I, ROBERT AITKEN, of the town of Brampton, in the county of Peel, in the Province of Ontario, Canada, machinist, have invented a certain new and Improved Band-Cutter and Feeder for Thrashing-Machines, of which the following is a specification.

The invention relates to band-cutters and feeders for thrashing-machines; and the novelty consists in the peculiar combinations and the construction and arrangement of parts, hereinafter more fully described, and then pointed out in the claims.

Figure 1 is a perspective outside view of my improved feed-box and attachments. Fig. 2 is a sectional elevation of the same. Fig. 3 is a cross-section showing the movable sides set to guide the bound sheaf. Fig. 4 is a perspective detail of the spreader.

In the drawings like letters of reference indicate corresponding parts in each figure.

A is an endless traveling canvas apron having a series of cross-slats, *a*, fastened on its surface. This apron A is supported at one end of the feed-box frame B by a roller, C, which is carried in suitable journals fixed to the frame of the feed-box. At the other end of the feed-box, in proximity to the thrashing-cylinder D, the apron A passes round a roller, E, which is driven by any suitable gearing, preferably located on the outside of the machine, which gearing is designed to impart motion to the roller E and apron A.

F are the sides of the feed-box B, and so arranged that they may be pressed out, as indicated in Fig. 3, to make the feed-box hopper-shaped, as indicated in the said Fig. 3.

*b* are slats hinged to the sides F, so that when extended out, as shown in Fig. 3, the said sides will project close to the canvas apron A, while they will fold up when the sides F of the feed-box are dropped down, as indicated in Fig. 1. On each side of the feed-box frame B, I journal a vertical spindle, G, on which is fastened an arm, H, the end of which is bent, as indicated in Fig. 1, and rubs against the plate I, fastened on each of the sides F. Each spindle G has an arm, J, connected to the hand-lever K by the rod L. The hand-levers K are pivoted at convenient points in the frame B, one being placed on each side of the machine; but the two spindles G are connected together by the chain M, which passes round sprocket-wheels fixed to the end of the spindles G, so that both spindles may be simultaneously revolved by moving either one or the other of the hand-levers K, which motion will cause the arms H to force out the sides F into the position indicated in Fig. 3. When the motion of the hand-lever K is reversed the sides F of course fall back into the position indicated in Fig. 1.

N is a saw fastened in the position indicated to a spindle passing through the pipe O, which is divided in the center. The saw-spindle is driven by the pulley P, and the saw is thereby caused to revolve while the pipe O remains stationary, so that no straw can wind round the spindle.

Assuming that the grain to be thrashed is bound into sheaves, the sides F would be set as indicated in Fig. 3. The sheaves are then thrown into the feed-box, and as their bottom side will rest upon the slatted traveling apron A the sheaf will be moved toward the thrashing-machine, and as the sides F hold the sheaf in the center of the box the band or cord holding the sheaf together must pass by the saw N, which in revolving cuts the band or cord and permits the sheaf to fall loose. The loosened sheaf is then carried past the saw by the motion of the traveling apron A, and as it passes below the revolving spreader Q the grain will be distributed evenly across the machine, so that when it comes in contact with the revolving feeder R it will be evenly distributed, and in that form will be fed into the thrashing-cylinder D.

On reference to Fig. 4 it will be seen that the spreader Q is a cylinder having a series of curved fingers, *d*, set round the cylinder in the form of a right and left hand screw, and curved substantially as shown in the drawings, so that each finger will clear itself of the straw while revolving in the direction indicated by arrows. The fingers of the feeder are curved the same as the fingers of the spreader D. Both the spreader Q and feeder R are carried in suitable adjustable bearing-boxes, and the bearing-boxes of the feeder are preferably held down by a spiral spring, *e*, so as to permit the feeder to yield upwardly in the event of an unusual quantity of straw passing through.

By providing a slatted traveling canvas apron, A, any grain which may fall from the sheaves while passing through the feed-box will be conveyed into the concave of the cylinder, and will from thence pass through the thrashing-machine.

What I claim as my invention is—

1. A feed-box having a bottom formed by an endless traveling apron, A, and adjustable sides F, designed to form the box hopper-shaped, in combination with the revolving saw N and means for moving said sides simultaneously, arranged substantially as and for the purpose specified.

2. A feed-box having a bottom formed by an endless traveling apron, A, in combination with hinged sides F and slats b, hinged to their bottom edges, substantially as and for the purpose specified.

3. The sides F, hinged to the feed-box frame B, in combination with the arm H, fixed to the spindle G, and the hand-lever K, substantially as and for the purpose specified.

4. The combination of the sides F, hinged to the feed-box frame B, the spindles G, provided with the arms H and J, the chain M, connecting the two spindles, and the hand-lever K, for operating the same.

5. The sides F, hinged to the feed-box frame B, and the plates I, secured to said sides, in combination with the spindles G, the arms H, secured thereto and having bent end, the chain M, connecting said spindles, and the hand-lever K, for operating the same, substantially as described.

Brampton, April 4, 1885.

ROBERT AITKEN.

In presence of—
B. F. JUSTIN,
JNO. D. GORDON.